(12) United States Patent
Mishaeli et al.

(10) Patent No.: US 9,058,201 B2
(45) Date of Patent: Jun. 16, 2015

(54) MANAGING AND TRACKING THREAD ACCESS TO OPERATING SYSTEM EXTENDED FEATURES USING MAP-TABLES CONTAINING LOCATION REFERENCES AND THREAD IDENTIFIERS

(75) Inventors: Michael Mishaeli, Zikhron Yaakov (IL); James B. Crossland, Banks, OR (US); Boris Ginzburg, Haifa (IL); Eliezer Weissmann, Haifa (IL)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 13/993,471

(22) PCT Filed: Dec. 28, 2011

(86) PCT No.: PCT/US2011/067646
§ 371 (c)(1),
(2), (4) Date: Jun. 12, 2013

(87) PCT Pub. No.: WO2013/100992
PCT Pub. Date: Jul. 4, 2013

(65) Prior Publication Data
US 2014/0013333 A1 Jan. 9, 2014

(51) Int. Cl.
G06F 9/46 (2006.01)
G06F 9/44 (2006.01)
G06F 9/48 (2006.01)
G06F 9/445 (2006.01)

(52) U.S. Cl.
CPC ...... *G06F 9/461* (2013.01); *G06F 9/46* (2013.01); *G06F 9/445* (2013.01); *G06F 9/48* (2013.01); *G06F 9/44* (2013.01)

(58) Field of Classification Search
None
See application file for complete search history.

(56) References Cited

U.S. PATENT DOCUMENTS

| 5,247,678 A * | 9/1993 | Littleton ...................... 719/331 |
| 5,291,585 A * | 3/1994 | Sato et al. ........................ 710/10 |
| 5,764,985 A * | 6/1998 | Smale ............................ 719/328 |
| 7,275,246 B1 | 9/2007 | Yates, Jr. et al. |
| 8,146,099 B2 | 3/2012 | Tkatch et al. |
| 8,627,284 B2 | 1/2014 | Stritzel et al. |
| 2006/0041878 A1 * | 2/2006 | Albot et al. ................... 717/162 |
| 2006/0150202 A1 * | 7/2006 | Bendapudi et al. ........... 719/328 |
| 2009/0094312 A1 * | 4/2009 | Powley et al. ................. 709/203 |
| 2009/0222842 A1 * | 9/2009 | Narayanan et al. ........... 719/328 |
| 2010/0180265 A1 * | 7/2010 | Tsai et al. ...................... 717/140 |
| 2010/0257539 A1 * | 10/2010 | Narayanan et al. ........... 719/311 |
| 2010/0293554 A1 * | 11/2010 | Rastogi et al. ................ 719/313 |
| 2012/0304200 A1 * | 11/2012 | Oliver et al. .................. 719/319 |
| 2013/0139182 A1 * | 5/2013 | Sethuraman et al. ......... 719/320 |

OTHER PUBLICATIONS

PCT International Search Report for PCT Counterpart Application No. PCT/US2011/067646, 4 pgs., (Jun. 25, 2012).
PCT Written Opinion of the International Searching Authority for PCT Counterpart Application No. PCT/US2011/067646, 5 pgs., (Jun. 25, 2012).
PCT Notification concerning Transmittal of International Preliminary Report on Patentability (Chapter I of the Patent Cooperation Treaty) for PCT Counterpart Application No. PCT/US2011/067646, 7 pgs., (Jul. 10, 2014).

* cited by examiner

*Primary Examiner* — Emerson Puente
*Assistant Examiner* — Benjamin Wu
(74) *Attorney, Agent, or Firm* — Nicholson De Vos Webster & Elliott LLP

(57) ABSTRACT

Extended features such as registers and functions within processors are made available to operating systems (OS) using an extended-state driver and by modifying instruction set extensions, such as XSAVE. A map-table designates a correspondence between memory locations for storing data relating to extended features not supported by the OS and called by an application. As a result, applications may utilize processor resources which are unsupported by the OS.

20 Claims, 9 Drawing Sheets

| MAP-TABLE 128 | | | | |
|---|---|---|---|---|
| TABLE LOCATION 202 | EXTENDED IDENTIFIER 202 | OS THREAD-ID 206 | ADDRESS POINTER 208 | EXTENDED-FEATURES IN-USE 210 |
| 1 | rsp/cr3 | 17857 | 130(1) | 0xF8 |
| 2 | | | | |

FIG. 2

MANAGING AND TRACKING THREAD ACCESS TO OPERATING SYSTEM EXTENDED FEATURES USING MAP-TABLES CONTAINING LOCATION REFERENCES AND THREAD IDENTIFIERS

CROSS-REFERENCE TO RELATED APPLICATION

This patent application is a U.S. National Phase Application under 35 U.S.C. §371 of International Application No. PCT/US2011/067646, filed Dec. 28, 2011, entitled CONTEXT-STATE MANAGEMENT.

BACKGROUND

Development times for computer processors, operating systems, and applications which execute thereon are often out of synchronization with one another. For example, a new processor design may be released every two years while new operating systems are released every three years. As a result, operating systems may be unable to access features present in new hardware, making these features unavailable for use by applications.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 2 depicts an illustrative map-table which may be used by the extended state driver to enable use of the extended features by the application.

DETAILED DESCRIPTION

Architecture

A computer processor, or "processor," is designed to execute instructions stored in memory and perform one or more various operations based on those instructions. As successive generations of processors are produced, designers may add extended features. These extended features may include registers, operations, and so forth which rely on additional hardware present in a particular generation of processor. An operating system comprises executable instructions which manage hardware within or coupled to the processor, handle data input and output, and otherwise provide an environment for execution of other applications.

Processors, operating systems, and applications may have different development timelines and may not be released contemporaneously. Also, software developers who create and maintain operating systems may not take advantage of particular extended features in a new processor until after the new processor design has been available for testing, debug, sale, and so forth.

Described herein are devices and techniques for enabling applications to utilize extended features which are unsupported by an underlying operating system. In one implementation, applications which call for the extended features and only utilize OS-service of context-switch may be enabled using the devices and techniques herein. This allows software developers to take advantage of these new features without waiting for the operating system developer to enable that extended feature in the operating system. The applications may thus benefit from these extended features which may minimize time to perform a computational task, reduce power consumption, enable new functions, and so forth.

Figure 1:
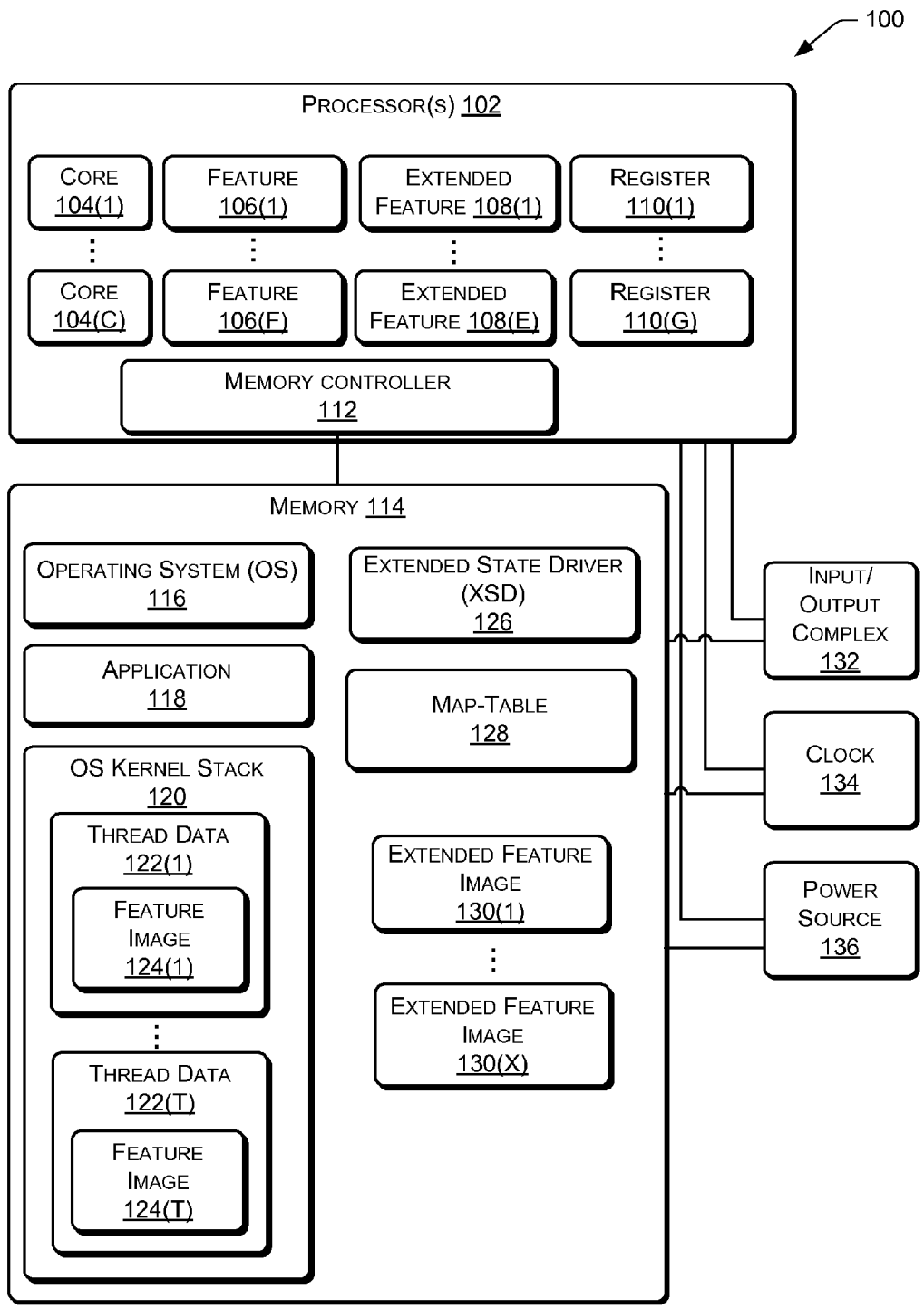
FIG. 1 illustrates an architecture including a processor and an extended state driver configured to provide extended features present in the processor to an application executing on the processor when the extended feature is unsupported by an operating system.

FIG. 1 illustrates an architecture 100 including one or more processors 102. These processors may be microprocessors, central processors, graphic processors, and so forth. Each processor 102 may in turn comprise one or more cores 104(1), 104(2), ..., 104(C). As used herein, letters in parenthesis such as (C) are positive integers greater than or equal to one. Each core 104 comprises a set of processing elements such as logic gates and other circuitry which accept input signals and generate output signals. Each core 104 may provide for a set of features 106(1), 106(2), ..., 106(F) as well as a set of extended features 108(1), 108(2), ..., 108(E). The features 106 and extended features 108 may be implemented as specific logical elements configured to provide particular outputs in response to inputs. The set of features 106 may be those which were available in previous generations of processor. The extended features 108 are features which are newer, having been added at a time after the features 106. These features 106 may utilize one or more registers 110 within or associated with the one or more cores 104.

In other implementations, the extended features 108 may be developed contemporaneously with the features 106, but provided only on particular processors 102 in a product line. For example, processor Gamma may offer the features 106, while processor Iota offers the features 106 plus the extended features 108.

As the extended features 108 are added, one or more additional registers 110(G) may also be added to support these extended features 108. The registers 110(G) are storage elements and may be part of the core 104 or coupled to the core 104, providing locations to store data. The registers 110 are read/write capable.

A memory controller 112 couples the processor 102 to memory 114 storage devices which are separate from the processor 102. In some implementations, the memory 114 may be allocated into "memory frames" into which data may be stored. In some implementations, the coupling may be provided using one or more electrically conductive wires. The memory 114 comprises computer-readable storage media ("CRSM") and may be any available physical media accessible by a computing device to implement the instructions stored thereon or store data within. CRSM may include, but is not limited to, random access memory ("RAM"), read-only memory ("ROM"), electrically erasable programmable read-only memory ("EEPROM"), flash memory, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the processor 102.

Within the memory 114 may be stored an operating system 116. The operating system 116 is configured to manage hardware and services within and coupled to the processor 102 for the benefit of the operating system ("OS") 116 and one or more applications 118. As part of this management, the OS 116 provides functionality allowing the applications 118 to access features within the processors 102, such as particular registers 110, logic elements, and so forth. However, the OS 116 may not necessarily support the extended features 108. Where the extended features 108 are unsupported by the OS 116, the applications 118 are unable to access those extended features 108. This causes the application 118 to improperly execute or otherwise fail to operate as designed or run with lower performance.

The applications 118 are sets of instructions which, when executed on the processor 102 perform operations or tasks. During operation, the application 118 and the OS 116 may store data within an OS kernel stack 120. The OS kernel stack 120 may comprise a dedicated region of memory 114 configured to store data. The OS 116 and the applications 118 may have a plurality of threads configured for execution on the processors 102. Within the OS kernel stack 120, thread data 122 from the threads may be stored. Within the thread data 122 may be feature image 124 data, storing information about the feature 106. The OS kernel stack 120 may store data for a plurality of threads 122(1), 122(2), . . . , 122(T), as well as corresponding feature images 124(1), 124(2), . . . , 124(T). In some implementations, the feature image 124 may be provided using an XSAVE feature as available on processors having certain architectures developed by Intel Corporation. In these implementations, the feature image 124 may be the XSAVE image.

An extended state driver 126 is stored in the memory 114. In some implementations, the extended state driver 126 may also be implemented as hardware logic. The extended state driver 126 allows the application 118 to access the extended features 108 which are unsupported by the OS 116. The extended state driver 126 provides and manages dedicated memory locations such as the extended feature image 130 in the memory 114 to store processor states associated with the extended features 108. The regular features 106 continue to have their state information stored within the OS kernel stack 120 and associated thread data 122 areas, while the extended state driver 126 services the extended features 108.

The extended state driver 126 would thus allow the application 118 to call upon the extended features 108 and utilize the associated registers 110. As described below in more detail, the extended state driver 126 builds a map-table 128 which is used to store extended feature image 130 data in the memory 114, outside of the OS kernel stack 120 locations. The map-table 128 comprises a data structure such as a table, linked list, array, and so forth which associates a particular thread and extended feature 108 called for by the thread with a particular extended feature image 130. The extended feature image 130 is used to store information regarding the extended feature 108. For example, the extended feature image 130 may be used to store data from the registers 110 associated with the extended features 108 after context switching out the thread, which allows another thread to execute on the processor 102.

In some implementations, existing instructions such as XSAVE and XRSTOR may be enhanced to provide additional functionality designed to work in conjunction with the extended state driver 126. For example, XSAVE may detect a particular value in a register such as the CPL3_XFEM value and based on that value determine whether to store a state in the OS kernel stack 120 or in the extended feature image 130. In some implementations a heap data structure may be used instead of a stack.

Use of the register such as the CPL3_XFEM thus allows the application to use features which the OS is not familiar with. A particular value such as the XFEM field in the feature image 124 such as one or more bits in the XSAVE image may also be used to indicate special handling by XRSTOR, such that when present XRSTOR looks for the extended feature image 130 rather than the OS kernel stack 120. Thus, features enabled by XFEM may be stored in the OS kernel stack 120 while the extended features enabled by the CPL3_XFEM may be stored in the extended feature image 130 as accessed by the extended state driver 126. In one implementation, an XHEADER portion of the XSAVE image may comprise an xstate_bv[63] value used to indicate the special handling, an xheader[23-16] value indicating a particular table location, and so forth.

Other devices may be coupled to the processor 102, the memory 114, or both. An input/output complex 132 may comprise one or more devices and logical elements which allow for the exchange of information between the processor 102, memory 114, and other devices such as peripherals. For example, the input/output complex 132 may comprise a universal asynchronous receiver/transmitter device. A clock 134 may provide timing signals to allow synchronization of circuitry within one or more portions of the device 100. A power source 136 provides electrical power to the processors 102, the memory 114, the input/output complex 132, the clock 134, and so forth.

In some implementations, such as in systems-on-a-chip, several of the elements described in FIG. 1 may be disposed on a single die. For example, the processor 102, memory 114, input/output complex 132, clock 134, and so forth may be disposed on the same die.

FIG. 2 depicts an illustrative map-table 128 which may be used by the extended state driver 126 to enable use of the extended features 108 by the application 118. The extended state driver 126 uses the map-table 128 to store data associating a particular thread with a particular extended feature image 130 which holds data associated with the extended feature 108. For example, the extended feature image 130 may contain register values, instructions, and so forth.

In one implementation, a single entry in the map-table 128 corresponds with a thread of a single application 118. The various extended features 108 which the thread 118 may deploy are thus serviced by the same single entry. The entry holds a memory pointer to a particular extended-feature image 130 in which all of the various extended feature registers 110 may be stored.

The map-table 128 may be implemented as a table, linked list, array, or other data structure. The map-table 128 may comprise attributes such as a table location 202, an extended identifier 204, an OS thread-ID 206, an address pointer 208, and an extended-features-in-use attribute 210 which indicates which extended features are in use. The table location 202 designates a particular entry within the map-table 128 as distinct from others. For example, in one implementation the table location 202 may comprise a non-zero integer number.

The extended identifier 204 may be based at least in part on architectural-state data maintained by the operating system 116 as executed on the processor 102. In one implementation, the extended identifier 204 may comprise a value from a stack pointer associated with the thread and a control register value associated with the thread. The pointer may also be stored in other data structures, such as a heap. In the case of the x86 architecture, this may comprise some combination of a stack pointer and a CR3 register used for translation of virtual addresses to a physical address.

The OS thread-ID 206 is populated with the operating system thread identifier number. This number 206 identifies the particular process as executing on the processor 102. For example, process 17857 as shown here. The address pointer 208 provides the location in the memory 114 of the extended feature image 130(1). This may comprise a virtual memory address or an actual hardware memory address.

The extended-features-in-use 210 attribute may be used to indicate all of the extended features 108 that the thread 118 is allowed to use. For example, the attribute may store bits identifying that an instruction of the extended features are to be used.

The contents and arrangement of the map-table 128 may be varied depending upon design considerations, processor 102 architecture, and so forth. Furthermore, the attributes shown above are provided by way of example, and not as a limitation. For example, in one implementation an OS-xsave-ptr field may be used which may contain data comprising thread context, OS kernel-stack frame pointer, CR3 register, XSAVE memory-image pointer, and so forth. In some implementations some of the attributes associated with a currently running thread may be held in dedicated system registers, such as the CPL3_XFEM register, which correlates with information in the map-table 128. This improves operation by allowing the thread to access the extended feature without referencing the map-table 128.

Illustrative Processes

The processes described in this disclosure may be implemented by the devices described herein, or by other devices. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 3:
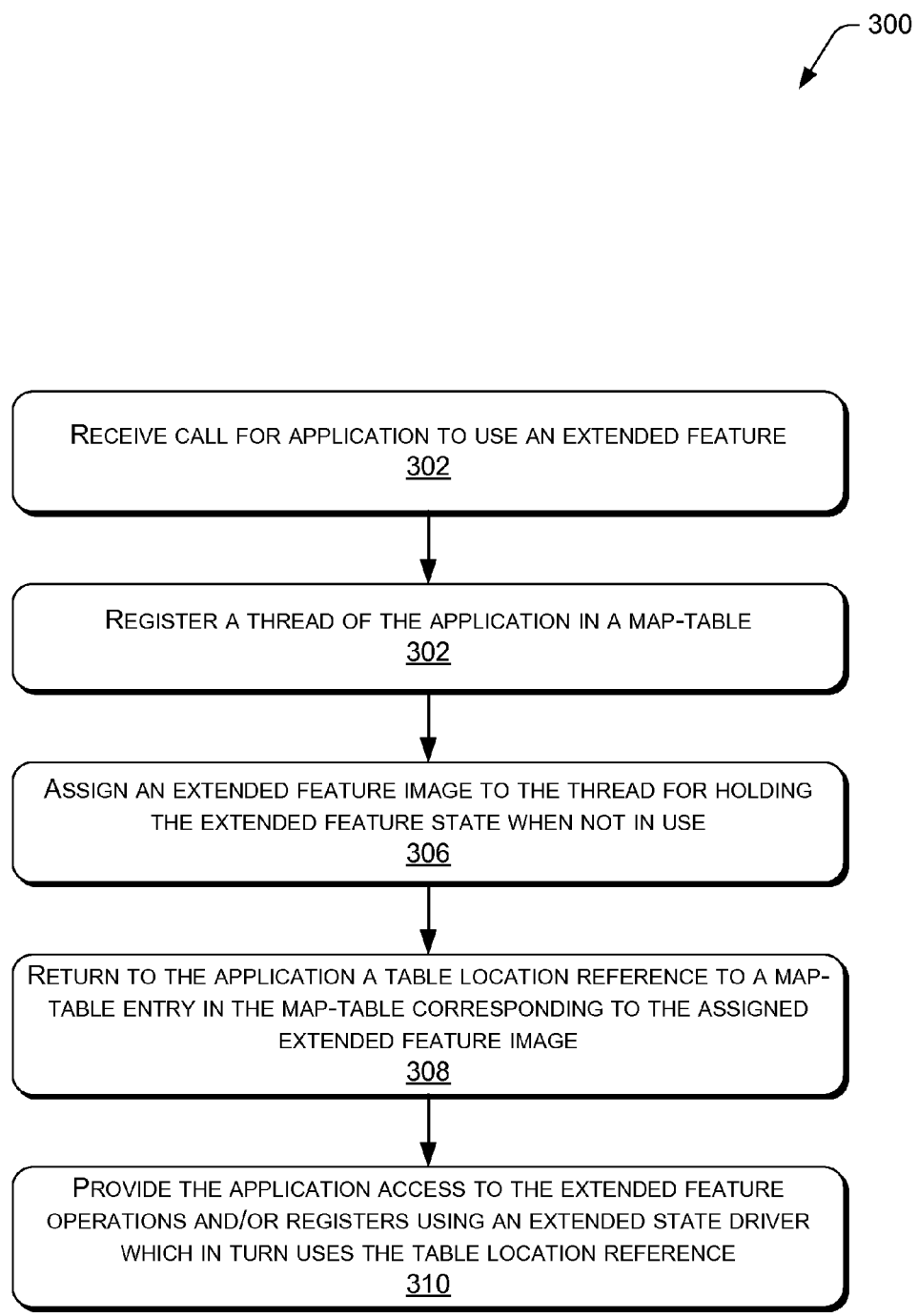
FIG. 3 is an illustrative process of enabling a new state to provide the application with access to extended features using the extended state driver.

FIG. 3 is an illustrative process 300 of enabling a new state to provide the application 118 with access to the extended features 108. The following process may be implemented by the extended state driver 126. At 302, the extended state driver 126 receives a call from application 118 for an extended feature 108 which is unsupported by the OS 116. In one implementation, the extended feature 108 may use an OS service for a context-switch as well as the particular registers and such of the extended feature 108.

At 304, a thread of the application 118 is registered in the map-table 128. In some implementations, this call to register may be done for all threads of the application 118 or only by the threads of the application 118 that include the extended features 108. This registration may include designating a blank location within the map-table 128 for storage of information as described above with regards to FIG. 2.

At 306, an extended feature image 130 is assigned to the thread for holding the extended feature 108 state when not in use. Data identifying the assigned extended feature image 130 is stored in the map-table, such as in the address pointer 208 attribute designating the extended feature image "130 (1)" as shown in FIG. 2.

At 308, a table location 202 reference is returned to the application 118 from the map-table 128 which corresponds to the assigned extended feature image 130. This table location reference 202 ay not be referenced directly or altered by the application 118. The table location reference 202 may be kept in the context of the application 118 until a time when context-switched out. At that time of context-switch out, the XSAVE instruction may find the memory pointer to the extended-feature image 130 by referencing the table location 202 reference. For example, the table location 202 value of "1" may be returned.

At 310, the application 118 may be provided access to the extended feature operations, extended feature registers, or both by using extended state driver 126 which in turn uses the table location 202 reference. In some implementations, direct access to the extended feature image 130 may be given to mechanisms such as XSAVE and XRESTORE which may manage the save and restore of the extended feature resources.

Figure 4:
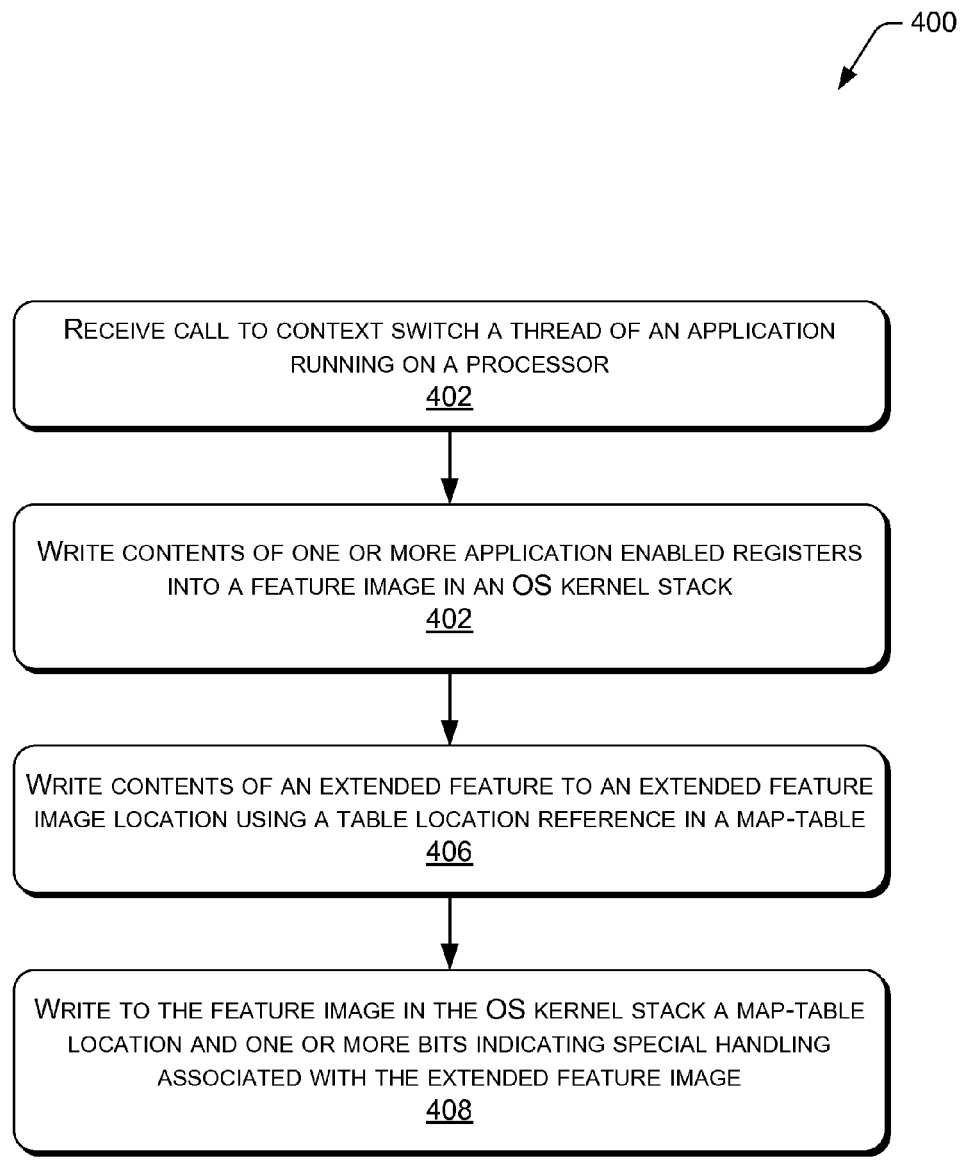
FIG. 4 is an illustrative process of context switching out a thread using the extended state driver.

FIG. 4 is an illustrative process 400 of context switching out a thread using the extended state driver 126. The application 118 may comprise many threads, each having a task to perform using the processor 102. In some implementations, multiple applications 118 may also be waiting for execution, resulting in many threads waiting for execution on the processor 102. An executing thread may be "context switched out" from the processor 102. When "context switched out", the thread is not terminated, but is suspended from execution on the processor 102. The execution state for the thread at the time of suspension may be stored in the OS kernel stack 120, the extended feature image 130, and so forth. Once suspended, another thread may be executed on the processor 102.

As described above, the following process may be implemented by the extended state driver 126. At 402, a call to context switch out a thread of the application 118 running on the processor 102 is received. At 404, contents of one or more registers 110 associated with the application 118 are written into the feature image 124 in the OS kernel stack 120. For example, the XSAVE instruction may be used to save the contents to the OS kernel stack 120.

At 406, contents of the extended feature 108 are written to an extended feature image 130 location in the memory 114 using the table location 202 reference in the map-table 128. At 408, a map-table location and one or more bits indicating special handling associated with the extended feature image 130 are written to the feature image 124 in the OS kernel stack 120.

Figure 5:
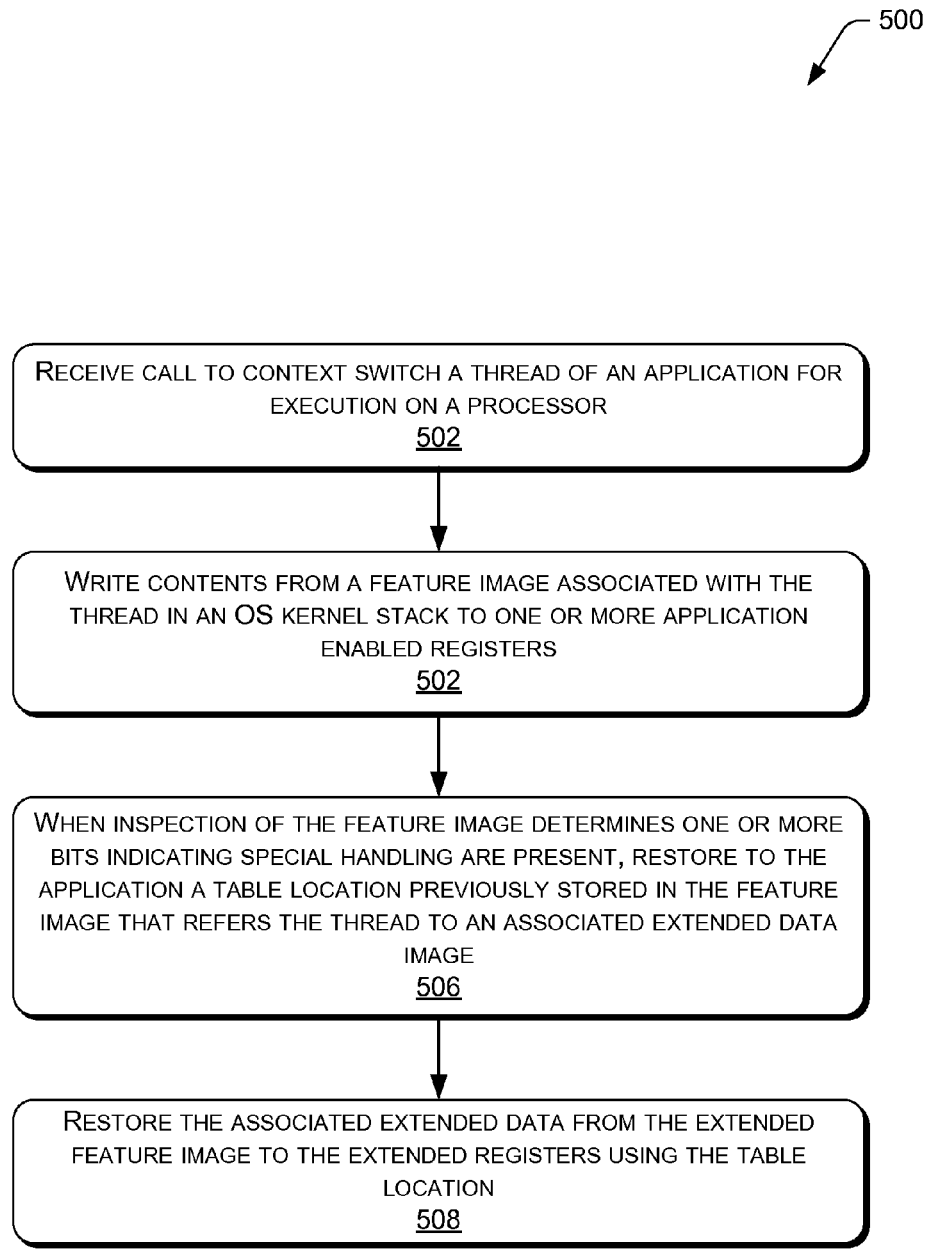
FIG. 5 is an illustrative process of context switching in a thread using the extended state driver.

FIG. 5 is an illustrative process 500 of context switching using the extended state driver. "Context switching in" a thread sets the processor 102 to execute the thread. This may be a new thread, or a thread which was previously context switched out. Context switching in may involve restoring previous state information, such as that which was saved during the context switch out operation described above. As also described above, the following process may be implemented by the extended state driver 126.

At 502, a call is received to context switch in a thread of an application 118 for execution on the processor 102. At 504, contents from a feature image 124 associated with the thread in the OS kernel stack 120 are written to one or more registers 110 within the processor 102 associated with the application 118. In some implementations, the XRSTOR function may be used to process this write.

At 506, when inspection of the feature image 124 determines one or more bits indicating special handling are present, a portion of the table location 202 previously stored in the feature image 124 that refers the thread to the associated extended data image 130 is restored to the application 118. For example, the extended-features-in-use 210 are written into the CPL3_XFEM register.

At 508, the associated extended data is restored from the extended feature image 130 to the extended registers 110 using the table location 202 reference in the map-table 128. The application 118 may now access the extended feature 108 which is otherwise unsupported by the OS 116.

Figure 6:
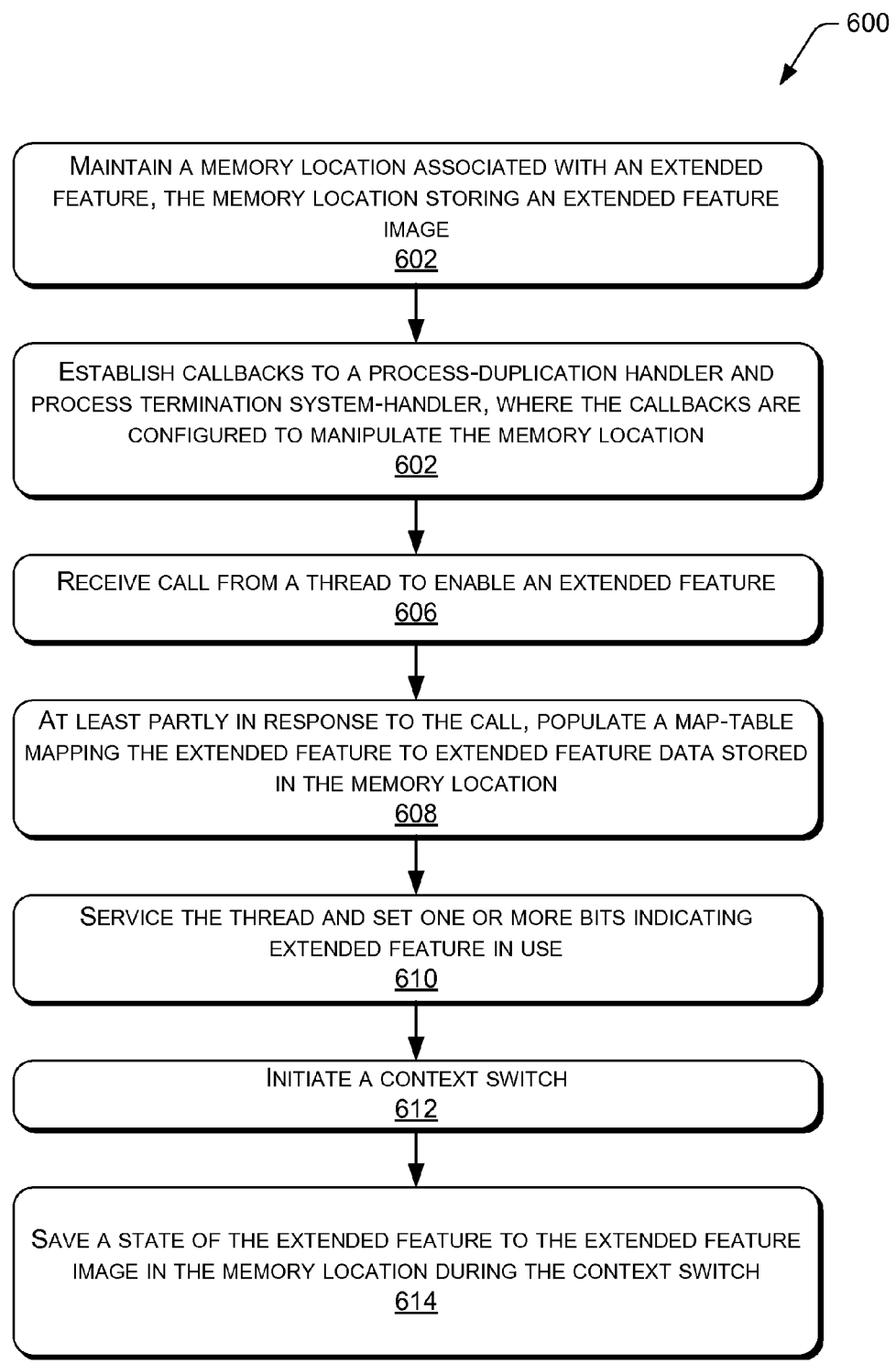
FIG. 6 is another illustrative process of providing a context switch.

FIG. 6 is another illustrative process 600 of providing a context switch in cooperation with the extended state driver 126 and map-table 128. The context switch occurs when a thread is context switched out and another thread is context switched in. At 602, a memory location associated with the extended feature 108 is maintained, where the memory location stores extended feature 108 data (e.g. particular registers 110 called upon by the extended feature 108). In some configurations, the memory location may be locked such that only particular handlers or processes of the OS 116 may make changes to data in the memory location.

At 604, callbacks are established to a process-duplication handler and process termination system-handler, where the callbacks are configured to manipulate the memory location. In some implementations, the handlers may comprise functions of the OS 116.

At 606, a call is received from a thread to enable the extended feature 108. In one implementation the thread may call with the EDX:EAX bit vector which refers to particular processor registers where the processor 102 implements the x86 architecture.

At 608, at least partly in response to the call, the map-table 128 is populated by mapping the extended feature 108 to extended feature data stored in the memory location. For example, the extended feature data may be stored in the extended feature image 130 in the memory 114.

At 610, the thread is serviced and one or more bits indicating that the extended feature 108 is in use are set. For example, the extended-features-in-use 210 attribute may be populated with one or more bits indicating that the extended feature 108 is in use, and in some implementations what the extended feature 108 is. For example, a CPL3_XFEM register may be set to a non-zero value. At 612, a context switch is initiated by receiving a signal such as a time tick, interrupt, or indication from the thread that it is waiting for a resource to become available. For example, the time tick may be generated at least in part as a result of timing pulses received from the clock 134.

At 614, at least partly in response to the initiation of the context switch, a state of the register 110 associated with the extended feature 108 is saved into the extended feature data in the memory location during a context switch. The context switch may be initiated by a process in the OS 116. Continuing the example, the data from the registers 110 for the extended feature 108 may be stored in the extended feature image 130.

Figure 7:
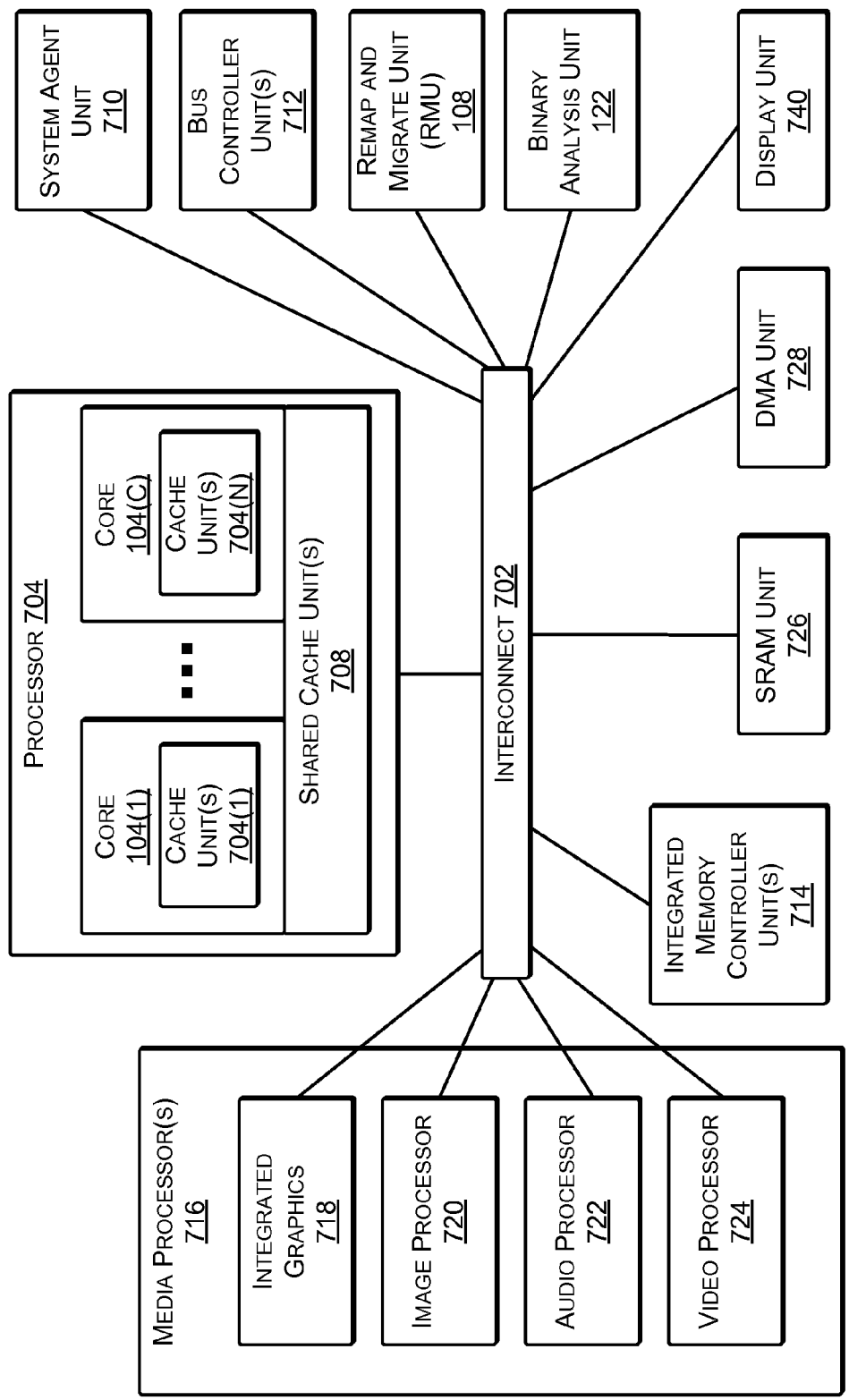
FIG. 7 is a block diagram of an illustrative system to perform context switching.

FIG. 7 is a block diagram of an illustrative system 700 to perform migration of program code between asymmetric cores. This system may be implemented as a system-on-a-chip (SoC). An interconnect unit(s) 702 is coupled to: one or more processors 704 which includes a set of one or more cores 104(1)-(N) and shared cache unit(s) 708; a system agent unit 710; a bus controller unit(s) 712; an integrated memory controller unit(s) 714; a set or one or more media processors 716 which may include integrated graphics logic 718, an image processor 720 for providing still and/or video camera functionality, an audio processor 722 for providing hardware audio acceleration, and a video processor 724 for providing video encode/decode acceleration; an static random access memory (SRAM) unit 726; a direct memory access (DMA) unit 728; and a display unit 740 for coupling to one or more external displays. In one implementation the RMU 108, the binary analysis unit 122, or both may couple to the cores 706 via the interconnect 702.

The processor(s) 704 may comprise one or more cores 104(1), 104(2), . . . , 104(C). The cores 104 may couple to one or more cache units 704(1), 704(2), . . . , 704(N). In some implementations, the processors 704 may comprise a single type of core, while in other implementations, the processors 704 may comprise two or more distinct types of cores. Each core may include an instance of logic to perform various tasks for that respective core. The logic may include one or more of dedicated circuits, logic units, microcode, or the like.

The set of shared cache units 708 may include one or more mid-level caches, such as level 2 (L2), level 3 (L3), level 4 (L4), or other levels of cache, a last level cache (LLC), and/or combinations thereof. The system agent unit 710 includes those components coordinating and operating cores 104(1)-(C). The system agent unit 710 may include for example a power control unit (PCU) and a display unit. The PCU may be or include logic and components needed for regulating the power state of the cores 104(1)-(C) and the integrated graphics logic 718. The display unit is for driving one or more externally connected displays.

Figure 8:
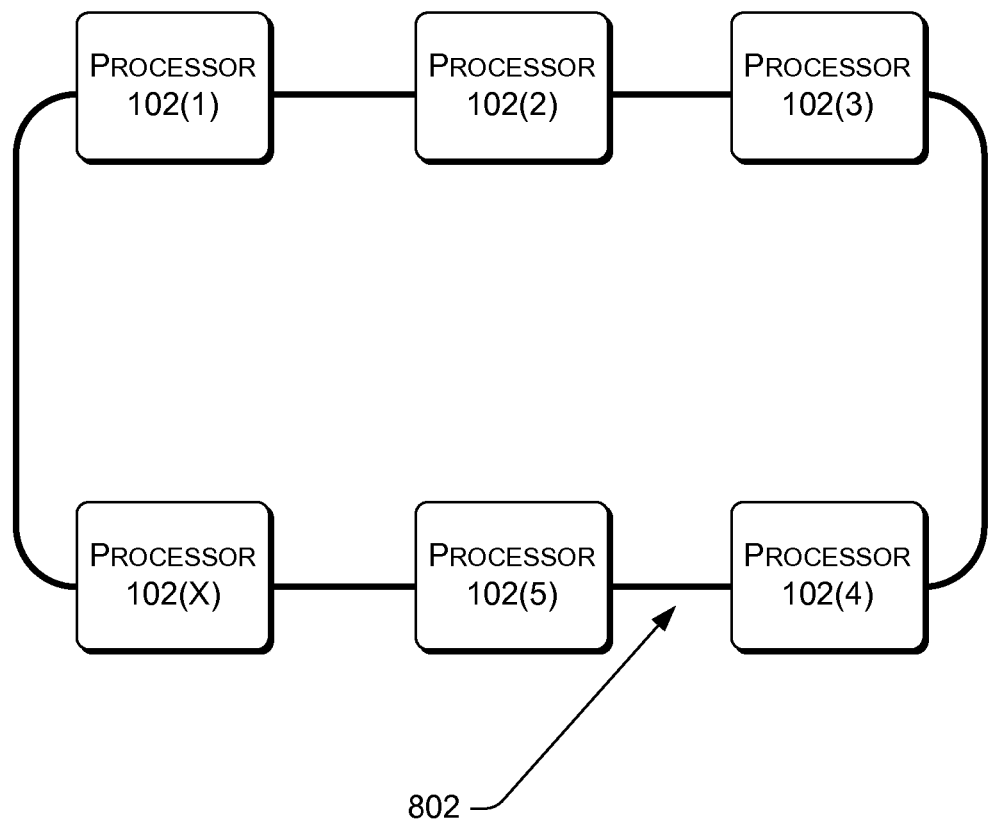
FIG. 8 is a schematic diagram of an illustrative multi-processor unit that uses an interconnect arranged as a ring structure.

FIG. 8 is a schematic diagram of an illustrative multi-processor unit 800 that uses an interconnect arranged as a ring structure 802. The ring structure 802 may accommodate an exchange of data between the processors 102(1), 102(2), . . . , 102(X). Within a given processor 102, a plurality of cores 104(1), 104(2), . . . , 104(C) may also be interconnected in a ring structure.

Figure 9:
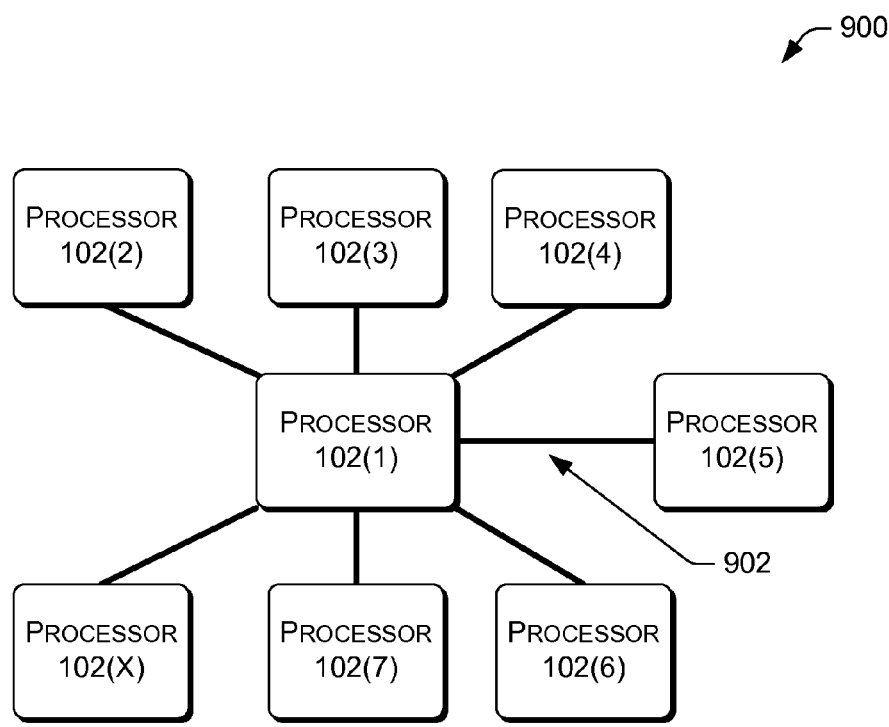
FIG. 9 is a schematic diagram of an illustrative multi-processor unit that uses an interconnect arranged as a mesh.

FIG. 9 is a schematic diagram of an illustrative multi-processor unit 900 that uses an interconnect arranged as a mesh 902. The mesh 902 may accommodate an exchange of data between the processor 102(1) and other processors 102(2), 102(3), . . . , 102(X) which are coupled thereto or between any combinations of the processors. Within a given processor 102, a plurality of cores 104(1), 104(2), . . . , 104(C) may also be interconnected in a mesh structure.

Figure 10:
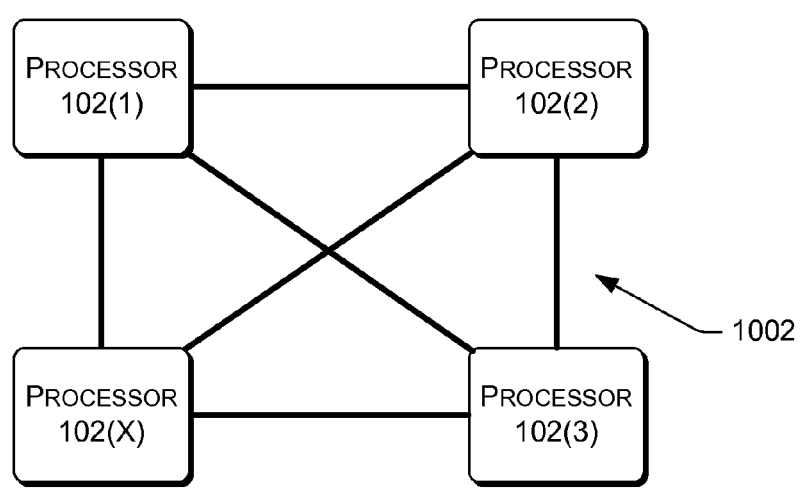
FIG. 10 is a schematic diagram of an illustrative multi-processor unit that uses an interconnect arranged in a peer-to-peer configuration.

FIG. 10 is a schematic diagram of an illustrative multi-processor unit 1000 that uses an interconnect arranged in a peer-to-peer configuration 1002. The peer-to-peer configuration 1002 may accommodate an exchange of data between any combinations of the processors 102(1), 102(2), . . . , 102(X). Within a given processor 102, a plurality of cores 104(1), 104(2), . . . , 104(C) may also be interconnected in a peer-to-peer configuration.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. An apparatus comprising:
 a processor;
 a memory;
 a driver module stored in the memory to:
  receive a call for an application to use an extended feature available on the processor;
  register a thread of the application in a map-table stored in a first location in the memory;
  assign an extended feature image location in the memory to the thread for holding a state of the extended feature when not in use;
  return to the application a table location reference to a map-table entry in the map-table corresponding to the assigned extended feature image location in the memory; and
  provide the application a register value to provide access to the extended feature.

2. The apparatus of claim 1, wherein the map-table entry in the map-table comprises the table location, an extended identifier, an operating system thread identifier, an address pointer referencing the extended feature image location in the memory, and one or more bits indicating which of one or more extended features are in use by the thread.

3. The apparatus of claim 1, wherein the map-table comprises an extended identifier based at least in part on architectural-state data maintained by an operating system executing on the processor.

4. The apparatus of claim 1, wherein the map-table comprises an extended identifier comprising a value from a stack pointer associated with the thread and a control register value associated with the thread.

5. The apparatus of claim 1, wherein the extended feature is unsupported by an operating system configured to execute on the processor.

6. The apparatus of claim 1, further comprising an operating system module to, upon receipt of a call to context switch out the application running on the processor:
 write contents of one or more application enabled registers associated with the application into a feature image in an operating system kernel stack stored in the memory;
 write contents of the extended feature to the extended data image location using the table location reference in the map-table; and
 write the feature image in the operating system kernel stack, the map-table location associated with the extended data image and one or more bits indicating special handling associated with the extended data image.

7. The apparatus of claim 6, wherein the writing of the contents of the one or more application enabled registers associated with the application uses an instruction from an instruction set to store the contents in the feature image in the operating system kernel stack stored in the memory.

8. The apparatus of claim 1, further comprising an operating system module to, upon receipt of a call to context switch in a second application for execution on the processor:
 write contents of a second feature image in an operating system kernel stack stored in the memory associated with a thread of the second application to one or more registers associated with the second application; and
 when inspection of the second feature image associated with the thread of the second application determines one or more bits indicating special handling are present, restore to the second application a map-table location previously stored in the second feature image that refers the thread of the second application to an associated second extended feature image; and
 restore the associated extended data from the extended feature image to the extended registers using the table location.

9. The apparatus of claim 8, wherein the writing of the contents of the second feature image in the operating system kernel stack uses an instruction from an instruction set to restore the contents from the second feature image in the operating system kernel stack stored in the memory.

10. A system comprising:
 one or more processors;
 a memory coupled to the one or more processors and containing a plurality of memory locations;
 a driver module to:
  maintain a map-table in one of the plurality of memory locations, the map-table comprising a table location and an address pointer referring to a particular memory location configured to store information corresponding to an extended feature used by a thread scheduled for execution, and one or more bits indicating which extended feature is in use by the thread;
  receive a call for an operating system context-switch; and
  when the one or more bits indicate the extended feature is used by the thread, accessing the memory location referenced by the address pointer to retrieve the information corresponding to the extended feature.

11. The system of claim 10, wherein the map-table further comprises an operating system thread identifier designating the thread using the extended feature.

12. The system of claim 10, wherein the map-table further comprises an extended identifier.

13. The system of claim 12, wherein the extended identifier is based at least in part on architectural-state data maintained by an operating system configured to execute on the one or more processors.

14. The system of claim 12, wherein the extended identifier comprises a value derived at least in part from a stack pointer associated with the thread and a control register value associated with the thread during execution on the one or more processors.

15. The system of claim 14, wherein the one or more processors use an Intel® 64 architecture and the control register value comprises CR3.

16. The system of claim 12, wherein the extended feature is unsupported by an operating system configured to execute on the one or more processors.

17. A processor to:
 maintain at least one memory location for each thread within a memory storage device, the memory location being associated with an extended feature and storing an extended feature image comprising data associated with the extended feature;
 establish callbacks to a process-duplication handler and process termination system-handler, wherein the callbacks are configured to manipulate the memory location;
 receive a call from a thread to enable use of the extended feature;
 at least partly in response to the call, populate a map-table to map the extended feature to an extended feature image stored in the memory location;

service the thread and setting one or more bits indicating the extended feature in use;
initiate a context switch; and
save a state of the extended feature to the extended feature image in the memory location during the context switch.

18. The processor of claim 17, wherein the extended feature is unsupported by an operating system.

19. The processor of claim 17, wherein the map-table comprising an extended identifier based at least in part on architectural-state data maintained by an operating system.

20. The processor of claim 17, wherein the map-table comprising a table location, an extended identifier, an operating system thread identifier, an address pointer referencing the memory location, and one or more bits indicating which of extended feature is in use by the thread.

\* \* \* \* \*